United States Patent Office 3,377,311
Patented Apr. 9, 1968

3,377,311
PREPARING SILICONE RUBBER
Kenneth Malcolm Roch, Dinas Powis, Glamorgan, Wales, assignor to Midland Silicones Limited, London, England
No Drawing. Filed Aug. 8, 1963, Ser. No. 300,905
10 Claims. (Cl. 260—37)

This invention relates to improved organopolysiloxane elastomers commonly designated as silicone rubbers and to a process for their preparation.

Finely divided silicas have long been known as desirable reinforcing fillers for silicone rubbers, that is, elastomers based on organopolysiloxanes. However, when vulcanisable organopolysiloxanes are compounded with finely divided reinforcing silicas it has been found that the compounded mass becomes tough, difficult to process and hardens on standing. This deterioration is frequently referred to as "crepe hardening" or "crepe aging." This toughness is believed to be due to undesirable interaction between the polymer and the filler and various methods have been proposed for overcoming this problem.

It has been proposed to incorporate into the mixture of organopolysiloxane and silica, hydroxylated organosilicon compounds such as diphenylsilanediol and triphenylsilanol or hydroxylated organosilicon polymers having the general formula $HOR_2SiO[R_2SiO]_nH$ where each R is, for example, a methyl or phenyl radical and $n$ is an integer greater than 1, and normally from about 2 to about 20 (see, for example, U.S. Patent No. 2,890,188, issued June 9, 1959). Other methods which have been suggested include the use of octamethylcyclotetrasiloxane or sulphur dioxide as treating agents for the reinforcing silicas. Silicone oils which are preferably those prepared by the hydrolysis of dimethyldichlorosilane or the cohydrolysis of dimethyldichlorosilane and trimethylchlorosilane have also been proposed as treating agents for silica fillers.

Although silica filled elastomers may now be prepared fairly conveniently and have found wide commercial acceptance, there is a continuing search for means by which the physical properties of such elastomers may be improved.

It is the primary object of this invention to introduce a novel surface-modified silica. A silicone rubber stock containing reinforcing silica and essentially free of silica-polymer interaction during storage is also an object of this invention. A silicone rubber of improved physical strength is a further object of this invention. Other objects and advantages of this invention are detailed in or will be apparent from the disclosure and claims following.

I have now found that the formation of structure, that is the premature hardening, which takes place on storing silica filled vulcanizable organopolysiloxanes may be minimized and even completely prevented by the inclusion in the filled stock of an organosilicon polymer in which one terminal silicon atom of said polymer has attached thereto a group capable of reaction with the hydroxyl groups present on the silica surface, the remaining terminal silicon atom of the polymer being substituted with groups which are relatively non-reactive with the silica surface. I have further discovered that the inclusion of such an organosilicon polymer leads to an elastomer having significantly improved physical properties, particularly that of tear resistance.

Accordingly the present invention provides a vulcanizable composition which comprises a mixture of (1) an organopolysiloxane convertible to the solid elastic state, (2) a finely divided reinforcing silica filler, and (3) an organosilicon polymer of the general formula $$R[R_2SiO]_nSiR_2X$$

in which each R is a monovalent hydrocarbon radical, X is a group reactive with the silica surface and $n$ has a value from 1 to 24 inclusive.

The invention further provides a process for the production of improved vulcanizable compositions which comprises moving the above defined ingredients (1), (2) and (3).

The convertible organopolysiloxanes employed in the preparation of the vulcanizable compositions of the present invention vary from viscous fluids of at least 10,000 cs. viscosity at 25° C. to stiff non-flowing gums. The methods of preparation of such organopolysiloxanes and their use in the manufacture of silicon elastomers are now well known. For example one method for the preparation of suitable convertible organopolysiloxanes involved the catalytic polymerization of cyclic siloxanes in the presence or absence of a material such as hexamethyldisiloxane which furnishes end-blocking units for the organopolysiloxane. The nature of the organic substituents present in the organopolysiloxane is not critical and they can be, for example, any one or more of the radicals methyl, ethyl, vinyl, phenyl, chlorophenyl, trifluoropropyl and cyanopropyl connected to the silicon atoms through silicon carbon linkages. Preferably the radicals are chosen from any one or more of methyl, vinyl and phenyl radicals, although it will be understood that when certain specific properties, for example, solvent resistance are required in the finished elastomer it is desirable to employ an organopolysiloxane which contains as substituents for example, fluoroalkyl or cyanoalkyl groups. The convertible organopolysiloxanes are preferably linear or substantially linear diorganosiloxane polymers containing an average of from about 1.95 to 2.05, preferably 1.99 to 2.01 organic radicals per silicon atom. Preferably at least 50 percent of the organic radicals present are methyl radicals.

The reinforcing silica fillers employed in the compositions of this invention are those silicas of fine particle size such as are obtained by the fume or precipitation processes. Such silicas are produced having a very high surface area to weight ratio and containing reactive groups, which are probably hydroxyl groups, attached to the silicon atoms as its surface. These fillers are fully disclosed in the art (see U.S. Patent No. 2,890,188). Generally the quantity of the reinforcing silica employed will be in the range of from 10 to 75 parts by weight for every 100 parts of the organopolysiloxane (1), although greater or less loadings of the silica can be employed if desired.

The reactive organosilicon polymers which comprise ingredient (3) of the compositions have the general formula $R[R_2SiO]_nSiR_2X$ where each R is a monovalent hydrocarbon radical, $n$ has a value of from 1 to 24 inclusive and X is an atom or radical reactive with the silica surface. Suitable as R groups are, for example, alkyl radicals such as methyl, ethyl and propyl, alkenyl radicals such as vinyl and allyl and aryl groups such as phenyl and naphthyl. The X atom or radical is one which is reactive toward the bound groups present on the silica surface. For example, X can be a hydrogen atom, a chlorine atom, a hydroxyl radical, an alkoxy radical or an acyloxy radical. The quantity of the reactive polymer employed will vary with the type and quantity of silica filler present in the compositions and with the nature of the reactive polymer itself. In general, but not exclusively the best results are obtained when the reactive ingredient (3) is present in the vulcanisable compositions in an amount of from about 20 parts to 100 parts by weight per 100 parts of the reinforcing silica.

The polymers which comprise ingredient (3) of the compositions of this invention can be prepared by any of several methods. For example, the polymers in which $n$ is 1 and X is a hydrogen atom can be prepared by the reaction of a silane of the formula HSiR₂Cl with a silane of the formula R₃SiOH in the presence of an acid acceptor for the by-produced HCl. The product can be employed as obtained or can be reacted with, for example, an oxidising agent or an alcohol to produce a polymer in which the X is a hydroxyl or alkoxyl radical.

Further, polymers in which $n$ has a value of 3, for example, can be prepared by reacting a cyclotrisiloxane with an organosilicon compound containing at least one silicon bonded halogen atom under conditions in which substantially no siloxane bond rearrangement or group cleavage takes place.

If desired the reinforcing silica filler can be treated with the reactive ingredient (3) prior to incorporating the silica with the convertible organopolysiloxane and this invention includes a reinforcing silica when so treated. However, this separate treating step is not essential and it is generally more convenient to incorporate the reactive ingredient (3) during the compounding of the convertible organopolysiloxane and the silica filler, thereby eliminating the extra processing step.

It has been found that in certain instances the silica treating agent is best employed in the presence of a catalyst which promotes the reaction between the X groups and the groups present on the silica surface. Suitable catalysts are those which act as condensation catalysts for organosilicon compounds. However, strong acids and bases such as hydrochloric acid and sodium hydroxide can cause depolymerisation of the convertible organopolysiloxane and their use is best avoided in the compounding step. More suitable as condensation catalysts are, for example, amines such as triethylamine morpholine and pyridine, basic organosilicon compounds such as silazanes and silylamines, ammonium carbonate and metal carboxylates such as dibutyl tin dilaurate, stannous octoate and other similar metal salts as described, for example, in U.S. Patents Nos. 2,843,555 and 2,927,907.

Although the presence of a catalyst is desirable its use is not essential in preparing the compositions of this invention, especially when the X groups of the reactive polymer (3) are, for example, hydroxy or acetoxy groups.

In preparing the elastomer forming compositions of this invention it has been found desirable to heat the mixture of the convertible organopolysiloxane, the silica filler, the reactive organosilicon polymer and, when employed, the catalyst. Alternatively, if it is desired to treat the silica prior to the compounding step the silica can first be treated with the reactive polymer and the catalyst (when employed) as a separate operation, the treated silica then being compounded with the convertible organopolysiloxane, and any other ingredient, by the usual techniques. During the pretreating step heat can be applied when necessary to expedite the reaction. When such a heating step is employed it can be carried out under a reflux arrangement (when necessary) and in the presence of a solvent, such as methyl alcohol. The presence of the solvent reduces the consistency of the system and assists in the reflux operation.

When desired other fillers and additives can be included in the compositions of this invention. For example fillers such as titanium dioxide, magnesium oxide, and non-reinforcing silicas such as diatomaceous earth can be employed in addition to the reinforcing silicas. Other additional ingredients can include heat stability additives and pigments such as ferric oxide.

Vulcanization of the compositions of this invention can be brought about by any of the techniques common to the art such as by means of high energy radiation, the use of 0.5 to 10 parts by weight per 100 parts of organosiloxane polymer (1) of an organic peroxide and perester compounds, for example 2,4-dichlorobenzoyl peroxide, monochlorobenzoyl peroxide, benzoyl peroxide, dicumyl peroxide, tertiary butyl perbenzoate and tertiary butyl peracetate, or by means of a crosslinking agent such as an alkyl silicate or polysilicate in the presence of a condensation catalyst.

The invention is illustrated by the following examples in which the quantities are expressed as parts by weight and in which the physical properties of the vulcanized elastomers were measured according to the methods laid down in British Standard 903, Part A7: 1957, Part A2: 1956, and Part A3: 1956, published by British Standards Institution, London, England.

Example 1

The convertible organopolysiloxane employed in this example was a copolymeric siloxane gum composed 13 percent by weight of phenylmethyl siloxane units, 86.85 percent by weight of dimethylsiloxane units and 0.15 percent by weight of methylvinylsiloxane units. 100 parts of this gum was compounded in a mixer with 50 parts of a fume silica having a surface area of 300 m.²/g. when measured by the B.E.T. nitrogen adsorption method, a solution of 30 parts of pentamethyldisiloxane in 75 parts of methanol and one part of stannous octoate. The mixer was sealed and the composition heated under reflux for about 4 hours. At the end of this period the mixture was heated at 180° C. under vacuum for two hours to remove volatiles.

When cool a portion of the stock prepared above was stored and the remainder was further compounded with 0.8 part of 2,4-dichlorobenzoyl peroxide per 100 parts of the convertible organopolysiloxane and vulcanized into sheets by hot pressing at 115° C. for 5 minutes. The physical properties of the vulcanized rubber were tested in the press cured state and after the vulcanized sheets had been post cured at 250° C. in an oven for periods of 4 hours and 24 hours. The results obtained are shown in Table 1 below.

TABLE 1

|  | Press cure, 5 min./115° C. | Post cure, 4 hr./250° C. | Post cure, 24 hr./250° C. |
|---|---|---|---|
| Hardness (BS °) | 39 | 59 | 68 |
| Tensile Strength (p.s.i.) | 1,180 | 1,240 | 890 |
| Elongation at break (percent) | 800 | 470 | 325 |
| Tear Strength (lb.) | 25.9 | 18.1 | 12.4 |

After 3 months storage the stock exhibited little or no crepe hardening. It was easily processable and bonded to form a cohesive sheet in less than one minute when milled on a two-roll mill.

For purposes of comparison a stock was compounded by mixing together 100 parts of the copolymeric phenylmethylvinylsiloxane gum employed above, 50 parts of a fume silica having a B.E.T. surface area of 300 m.²/g. and 17.5 parts of a low molecular weight hydroxylated siloxane of the general formula HO[Me₂SiO]$_n$SiMe₂OH where $n$ has an average value of between 10 and 17 and Me is a methyl radical.

The stock was further compounded with 0.8 part of 2,4-dichlorobenzoyl peroxide as curing agent and employed to prepare vulcanized sheets by moulding between platens for 5 minutes at 115° C. The physical properties of the vulcanized rubber were measured following the press cure and oven post cures of 4 hours and 24 hours at 250° C. The results obtained are shown in Table 2.

TABLE 2

|  | Press cure, 5 min./115° C. | Post cure, 4 hr./250° C. | Post cure, 24 hr./250° C. |
|---|---|---|---|
| Hardness (BS °) | 53 | 63 | 66 |
| Tensile Strength (p.s.i.) | 1,100 | 900 | 820 |
| Elongation at break (percent) | 320 | 240 | 200 |
| Tear Strength (lb.) | 11.5 | 10.0 | 9.2 |

Example 2

100 parts of the copolymeric siloxane gum employed in Example 1 was compounded in a mixer with 40 parts of a fume silica (B.E.T. surface area 300 m.²/g.), 20 parts of pentamethylmonoethoxydisiloxane and 1 part of stannous octoate. The system was sealed and the mix heated under reflux for 3 hours the mixing operation being continued. A further heating step under vacuum for 2 hours at 180° C. was then carried out and the mix thereafter was allowed to cool. The stock was compounded with 2,4-dichlorobenzoyl peroxide and vulcanized as described in Example 1 and the resulting rubber had the following physical properties.

TABLE 3

|  | Cure, 5 min./115° C. | Post Cure, 24 hr./250° C. |
| --- | --- | --- |
| Hardness (BS°) | 34 | 46 |
| Tensile Strength | 1,520 | 1,275 |
| Elongation at break (percent) | 660 | 430 |
| Tear Strength (lb.) | 19.5 | 12.0 |

Samples of the vulcanized stock were found to be easily processable when milled after storing for 3 months no crepe hardening having taken place during the period of storage.

Example 3

The procedure of Example 2 was repeated except that the stannous octoate was this time omitted from the mix and the pentamethylmonoethoxydisiloxane was replaced by 20 parts of pentamethylmonomethoxydisiloxane. The vulcanized rubber had the following physical properties.

TABLE 4

|  | Press Cure, 5 min./115° C. | Post Cure, 24 hr./250° C. |
| --- | --- | --- |
| Hardness (BS°) | 40 | 57 |
| Tensile Strength (p.s.i.) | 1,575 | 800 |
| Elongation at Break (percent) | 580 | 215 |
| Tear Strength (lb.) | 24.6 | 8.7 |

A portion of the unvulcanized stock which had been stored for 3 months exhibited no crepe-hardening at the end of this storage period and was easily processable.

Example 4

40 parts of a fume silica, 20 parts of pentamethylmonoethoxydisiloxane, 1200 parts of methanol and 1 part of concentrated hydrochloric acid were charged to a reaction vessel and periodically agitated over a period of 3 days. The contents of the vessel were then filtered, washed free of acid with methanol and finally dried at 150° C.

50 parts of the treated filler was compounded with 100 parts of the copolymeric siloxane gum employed in Example 1 and 0.8 part of 2,4-dichlorobenzoyl peroxide. When vulcanized the stock exhibited the physical properties listed in Table 5 below.

TABLE 5

|  | Press Cure, 5 min./115° C. | Post Cure, 24 hr./250° C. |
| --- | --- | --- |
| Hardness (BS°) | 53 | 83 |
| Tensile Strength (p.s.i.) | 1,425 | 850 |
| Elongation at Break (percent) | 735 | 200 |
| Tear Strength (lb.) | 32.4 | 12.0 |

After storage for a period of 3 months the unvulcanized stock exhibited no significant crepe hardening and was easily processable.

Example 5

100 parts of the copolymeric siloxane gum employed in Example 1 was compounded with 50 parts of a fume silica having a B.E.T. surface area of 300 m.² per gram and 25 parts of the compound $$CH_3(C_6H_5)_2Si\text{---}O\text{---}Si(CH_3)_2OC_2H_5$$

in conventional rubber mixing equipment. During the mixing operation the temperature of the mix was raised to 180° C. and maintained under vacuum at this temperature for 4 hours.

When cool the stock was vulcanized and tested according to the procedure of Example 1. The vulcanized elastomer had the physical properties given in Table 6.

TABLE 6

|  | Press Cure, 5 min./115° C. | Post Cure, 24 hr./250° C. |
| --- | --- | --- |
| Hardness (BS°) | 45 | 53 |
| Tensile Strength (lb.) | 1,400 | 1,220 |
| Elongation at Break (percent) | 750 | 600 |
| Tear Strength (lb.) | 27 | 15 |

After 3 months storage the stock had not hardened.

Example 6

The procedure of Example 5 was repeated employing 25 parts of the siloxanol, $(CH_3)_3Si[\text{---}OSi(CH_3)_2]_3\text{---}OH$, in place of ethoxysiloxane.

When vulcanized the stock possessed the physical properties in Table 7.

TABLE 7

|  | Press Cure, 5 min./115° C. | Post Cure, 24 hr./250° C. |
| --- | --- | --- |
| Hardness (BS°) | 52 | 60 |
| Tensile Strength (p.s.i.) | 1,470 | 1,200 |
| Elongation at Break (percent) | 745 | 550 |
| Tear Strength (lb.) | 26 | 18 |

The stock did not crepe harden on storage.

Example 7

Equivalent silicone rubber stocks and elastomers were achieved when Example 4 was repeated employing 25 parts of each of the following siloxanes in place of the ethoxydisiloxane $[(CH_3)(CH_3)_2SiOSi(CH_3)_2OC_2H_5]$ employed therein:

$$(CH_3)_2(C_6H_5SiOSi(CH_3)(C_6H_5)Cl$$
$$(CH_3)_3SiO[(CH_3)_2SiO]_{10}Br$$
$$(CH_3)_3SiOSi(CH_3)_2OOCCH_3$$

$$(C_2H_5)_2CH_2=CHSiO[C_2H_5(C_3H_7)SiO]_5\overset{O}{\overset{\|}{C}}CH_2CH_2CH_3$$

$$(C_6H_5)_2CH_3CH=CHSiO[(CH_3)_2SiO]_{20}H$$

$$(CH_3)_3SiOSi(CH_3)_2OC_3H_7$$

That which is claimed is:

1. A process for preparing a sulface-modified silica for use as a filler in organopolysiloxane elastomeric compositions, which comprises contacting a finely divided reinforcing silica filler with a compound of the general formula $R[R_2SiO]_nSiR_2X$ in which each R is a monovalent hydrocarbon radical, each X is a monovalent substituent selected from the group consisting of hydrogen and halogen atoms, alkoxy, hydroxy and acyloxy radicals, and $n$ has a value from 1 to 24 inclusive.

2. A surface-modified silica when prepared by the process claimed in claim 1.

3. A process for preparing a vulcanizable composition which comprises mixing together (1) an organopolysiloxane convertible to the solid elastic state, (2) a finely divided reinforcing silica filler, and (3) a compound of the general formula $R(R_2SiO)_nSiR_2X$ in which each R is a monovalent hydrocarbon radical, each X is selected from the group H, halogen, alkoxy, —OH and acyloxy and $n$ has a value from 1 to 24 inclusive, said process being carried out in the presence of a catalyst capable of accelerating the reaction between the X groups and the silica surface.

4. A process as claimed in claim 3 wherein there is mixed together (1) 100 parts by weight of an organopolysiloxane convertible to the solid elastic state, (2) from 10 to 75 parts by weight of a reinforcing silica filler, and (3) from 2 to 75 parts by weight of a compound of the general formula $R[R_2SiO]_nSiR_2X$ wherein each R is a monovalent hydrocarbon radical, X is selected from the group H, halogen atoms, —OH, alkoxy and acyloxy and $n$ has a value of from 1 to 24 inclusive.

5. A process as claimed in claim 4 wherein the X groups in the compound (3) are a lower alkoxy radical.

6. A process as claimed in claim 4 wherein the convertible organopolysiloxane (1) is a diorganopolysiloxane in which at least 50 percent of the organic substituents present are methyl radicals, any other substituents present being selected from phenyl radicals and vinyl radicals.

7. A process as claimed in claim 4 wherein the mixture is heated to a temperature not exceeding 300° C.

8. A composition consisting essentially of a mixture of (1) 100 parts by weight of an essentially linear diorganosiloxane polymer, wherein the organic substituents are selected from monovalent hydrocarbon radicals, monovalent halogenohydrocarbon radicals and cyanoalkyl radicals, (2) 10–75 parts by weight of a reinforcing silica filler, (3) 2–75 parts by weight of a lower polymeric siloxane of the general formula $R[R_2SiO]_nSiR_2X$ where each R is a monovalent hydrocarbon radical, each X is selected from the group consisting of hydrogen and halogen atoms, hydroxyl, alkoxyl and acyloxyl radicals and $n$ is an integer less than 25 and greater than 0, and (4) a vulcanizing agent.

9. The composition of claim 8 wherein the vulcanizing agent is selected from the group consisting of organic peroxides and peresters.

10. A silicone elastomer prepared by heating the composition of claim 9 above the activation temperature of the vulcanizing agent.

References Cited

UNITED STATES PATENTS

| | | | |
|---|---|---|---|
| 2,870,109 | 1/1959 | Nickerson | 106—308 |
| 2,890,188 | 6/1959 | Konkle et al. | 269—37 |
| 3,238,157 | 3/1966 | Smith | 260—37 |

OTHER REFERENCES

E. L. Warrick and P. C. Lauterbur: Ind. and Eng. Chem., vol. 47, No. 3, March 1955, pages 486–91.

JULIUS FROME, *Primary Examiner.*

MORRIS LIEBMAN, *Examiner.*

J. E. CALLAGHAN, *Assistant Examiner.*